Inventor:—
Max Wolmer Hansen Woldgaard
By his Attorney:— Walter Gunn

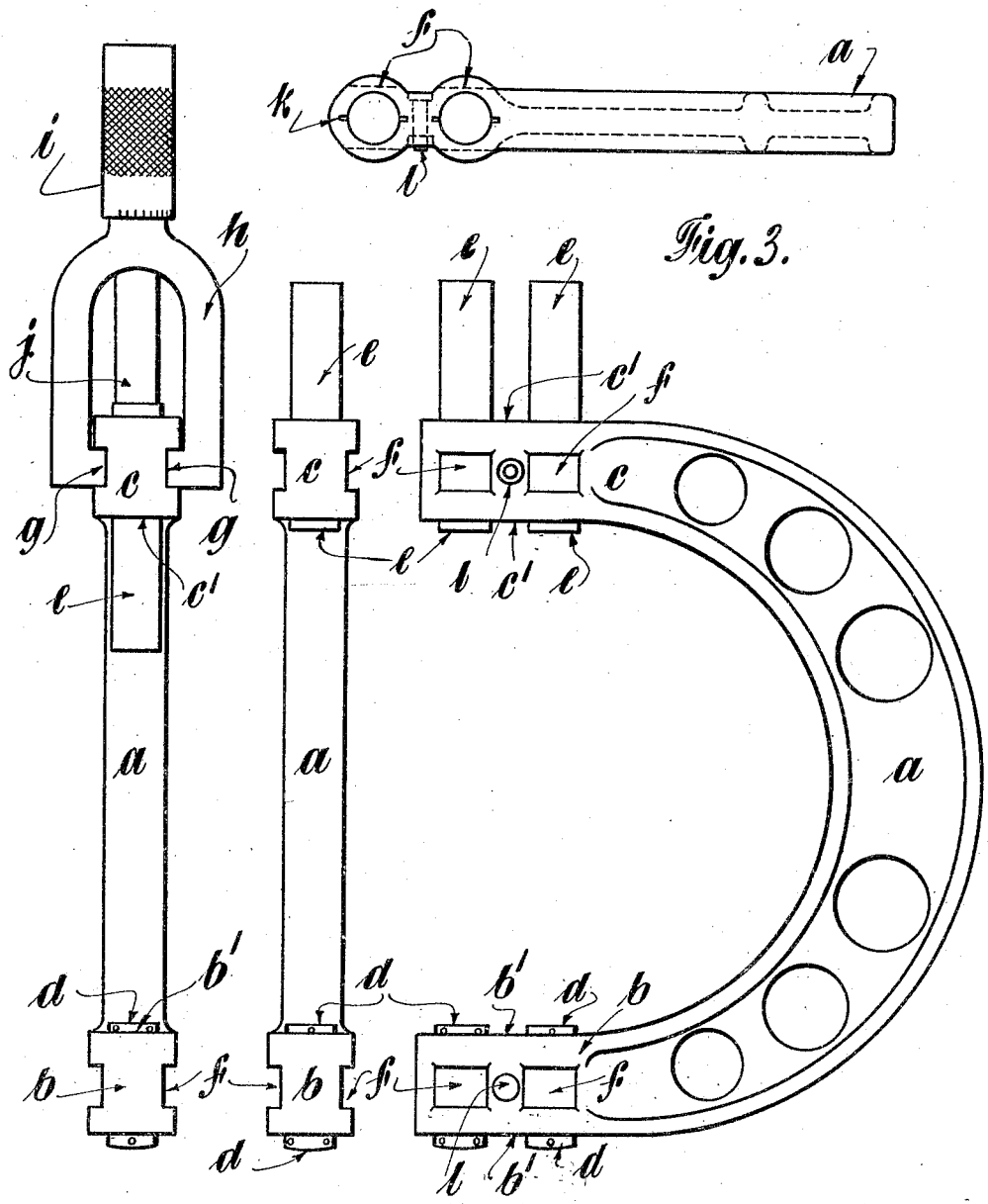

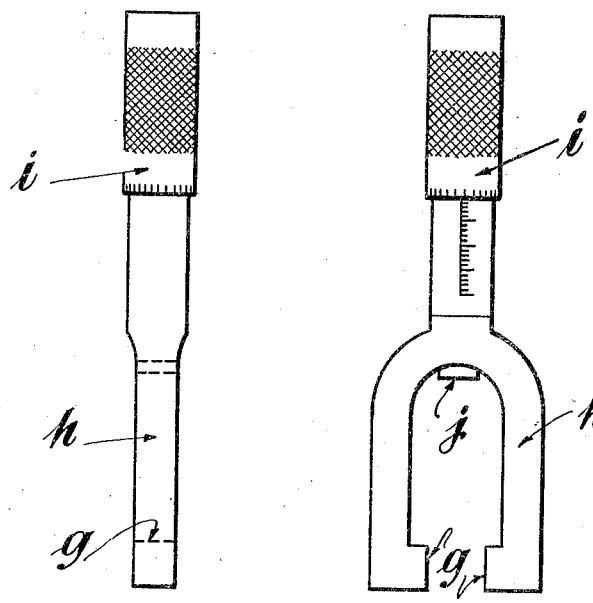
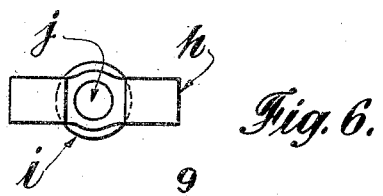
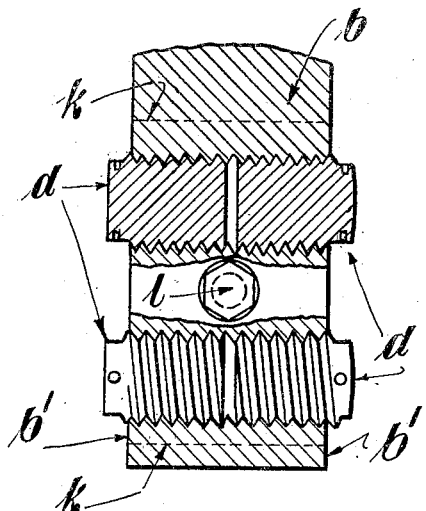
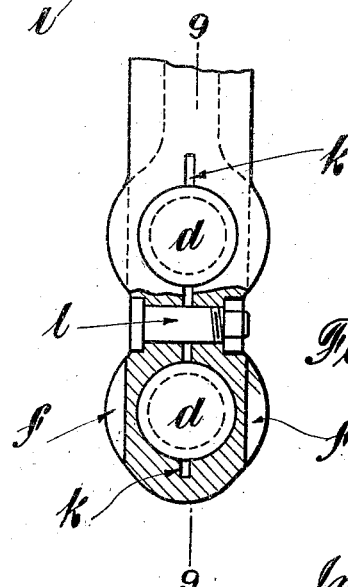

UNITED STATES PATENT OFFICE.

MAX WOLMER HANSEN WOLDGAARD, OF ECCLES, NEAR MANCHESTER, ENGLAND.

GAGE.

1,363,297.  Specification of Letters Patent.  Patented Dec. 28, 1920.

Application filed September 30, 1918. Serial No. 256,352.

*To all whom it may concern:*

Be it known that I, MAX WOLMER HANSEN WOLDGAARD, a subject of the King of Denmark, and resident of Eccles, near Manchester, England, have invented certain new and useful Improvements in or Relating to Gages, of which the following is a specification.

This invention relates to gages or precision measuring instruments of the adjustable snap or limit type, and has for its object to provide gages of the kind referred to in combination with a micrometer device for accurately setting the same.

According to the invention the improved gages are formed with a bow or other suitably shaped frame, one limb of which is provided with a fixed or adjustable anvil or anvils and the other limb of which is provided with an adjustable bar or bars. The latter limb is adapted to receive and engage the suitably shaped frame of a micrometer head and to retain the same with the micrometer screw or spindle in line with the adjustable bar or bars and in contact with the same. Means are provided to lock said bar or bars in the required position and when said means are inoperative the micrometer head can be applied to the gage frame, with the screw spindle in engagement with the adjustable bars or one of them, and said bar or bars adjusted to measure the required size, and the parts may be so arranged that the gage can be set for internal as well as external measurement. Standards may be provided to adjust the anvil or anvils but preferably the limb of the gage frame to which they are attached is adapted to receive the micrometer head so that said anvil or anvils may be tested for wear and corrected by the same if necessary.

Figure 1 is a side elevation of a gage constructed according to the invention with the micrometer head removed.

Fig. 2 is a front view, and

Fig. 3 an end view of Fig. 1.

Fig. 4 is a view corresponding to Fig. 2 but with the micrometer head in operative position.

Figs. 5 to 7 are side, inverted plan, and edge views respectively of the micrometer head shown detached.

Fig. 8 is a detail view of the means for locking the adjustable members and

Fig. 9 is a sectional view on line 9, 9 of Fig. 8.

Figure 10:
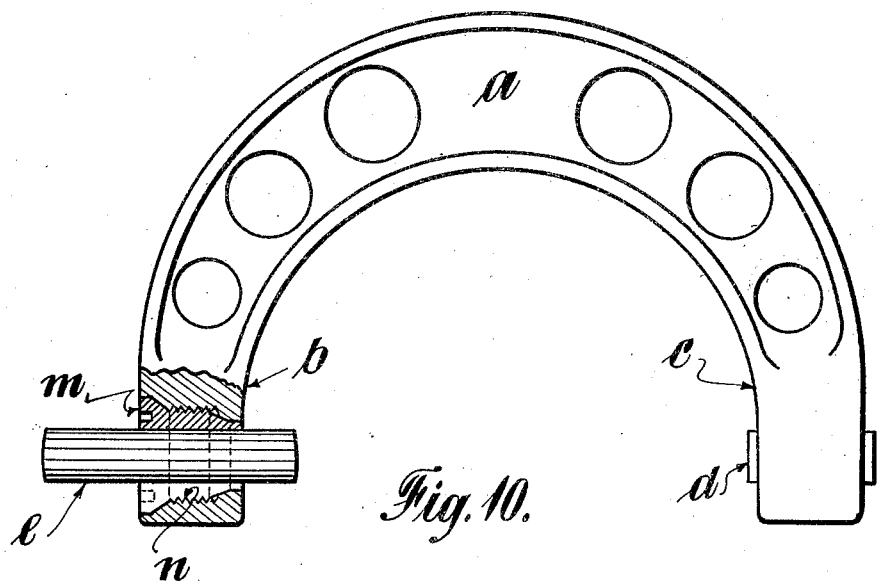

Fig. 10 is a side elevation of a snap gage one end of which is in section to show more clearly modified means for locking the adjustable member in position.

Figures 11, 12:
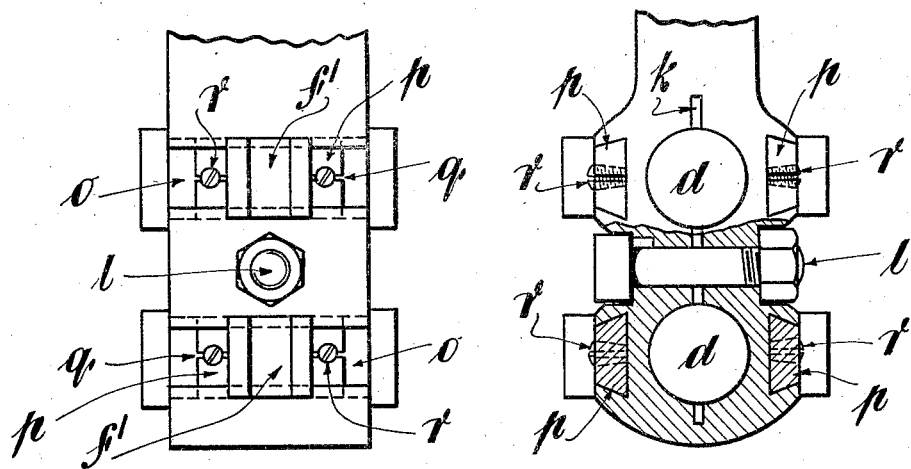

Fig. 11 is a detail view, drawn to an enlarged scale of the end of a gage showing adjustable slots to receive the micrometer head.

Fig. 12 is a part sectional view of Fig. 11 and

Figure 13:
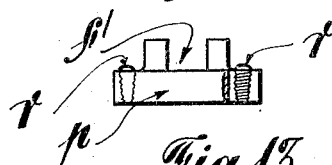

Fig. 13 is a detail view of the slotted member removed.

In carrying the invention into effect according to one convenient method and as applied to an adjustable limit gage, a bow shaped frame $a$ is provided, the limbs $b$ and $c$ of which are bored to receive two sets of adjustable bars or spindles, the members of each set being arranged in axial alinement and one member $d$ of each set constituting the anvil, while the other member $e$ of the same set constitutes the adjustable bar proper. Midway in the width of each limb $b$, $c$ and on each side of the same, an accurately formed slot $f$ is provided to receive the over-hung ends $g$ of a stirrup shaped frame $h$ to the bow of which is connected a micrometer head $i$ of usual, or other convenient construction, the spindle $j$ of said head projecting centrally into the stirrup shaped frame.

The adjustable bars are retained in position by any suitable means and this can be conveniently effected by slotting the bow frame at $k$, (see Figs. 8 and 9) and providing a locking pin $l$ by means of which the adjustable members are securely clamped in position. Alternately a split sleeve $m$ (see Fig. 10) slidably mounted upon said bars and having external threads $n$ to screw into corresponding threads in the frame borings is provided said boring also being formed with inclined or conical portions adapted to engage corresponding externally inclined or conical portions on the sleeves as clearly shown in the drawings, so that the latter grip and hold the bars when screwed home, tommy-holes or the like being provided for manipulating purposes. The micrometer slots are at a standard distance apart and in practice when the micrometer head $i$ is set to zero and is placed in engagement with any of the adjustable bars, said bar projects in that direction beyond the end faces $b'$, $b'$, or $c'$, $c'$, of the limbs $b$, $c$ for a known distance, which is a constant and which allows of adjustment for wear if necessary. When it is necessary to move the adjustable bars proper to gage different sizes, the micrometer head $i$ is adjusted proportionately and the adjustable bars are slackened and moved into engagement with the micrometer spindle $j$ after which it is locked in the adjusted position as before explained.

Referring to Figs. 11 to 13 the gage frame is formed with longitudinal dove-tail slots $o$ to receive a member $p$ which is slidably mounted therein. A slot or groove $f'$ to engage the micrometer head is formed in each member $p$ and the ends of the latter are split at $q$ so that they can be sprung apart by means of the tapered grub-screw $r$, in order to secure said members at any desired point along the slot $o$. Such an arrangement permits the groove $f$ to be adjusted to suit the micrometer head being used.

The adjustments are made from the inner or outer side of each limb according as it is desired to set the gage for inside or outside use. It will be understood that various means may be used for locking the moving members in the adjusted position and also for temporarily connecting the micrometer head to the gage frame.

By these means an extremely accurate gage is obtained capable of practical use throughout a greater range of sizes than hitherto used in micrometer gages; of corresponding accuracy and the wear upon the moving parts is practically *nil* thereby insuring a long life. The gages are comparatively cheap to use as one micrometer head may be used to set any number of gages; further said gages may be used for measuring with different units for instance in the metric system or with inches by using a correspondingly calibrated micrometer head.

What I claim is:—

1. An adjustable snap or limit gage comprising in combination a frame, longitudinally adjustable measuring members in said frame, a micrometer head, means to temporarily connect said head to the frame in correct operative position relatively to the adjustable members, and means to lock the latter in the adjusted position, substantially as described.

2. An adjustable snap or limit gage comprising in combination a frame, a longitudinally adjustable measuring member mounted in said frame, a micrometer head, means to temporarily connect said head to the frame in correct operative position relatively to the adjustable member and means to lock the latter in the adjusted position, substantially as described.

3. An adjustable snap or limit gage comprising a frame an anvil on said frame, an adjustable member mounted in said frame in alinement with the anvil, means to temporarily connect a micrometer head to said frame with the spindle in operative connection with the adjustable member and means to lock said latter member in the adjusted position.

4. An adjustable snap or limit gage comprising a bow-shaped frame, adjustable members in each limb of said frame, means to temporarily connect a micrometer head to either limb of the frame with the spindle in operative connection with the adjustable members whereby a micrometer reading of the size of the gage is obtained, substantially as described.

5. An adjustable snap or limit gage comprising a bow-shaped frame longitudinally adjustable gage members in said frame, means to temporarily connect a micrometer head to said frame with the spindle in operative connection with the gage members with either end of the same, so that said members can be set by the micrometer head to give internal or external measurements, substantially as described.

6. An adjustable snap or limit gage comprising a bow-shaped frame, and longitudinally adjustable measuring members mounted in the limbs of said frame, said limbs having slots formed therein, a micrometer head provided with a stirrup shaped frame the free ends of which are flanged and adapted to engage with the slots in the gage frame, substantially as described.

7. An adjustable snap or limit gage comprising a bow-shaped frame, longitudinally adjustable measuring members in the limbs of said frame, said limbs having slots formed therein, a micrometer head provided with a U-shaped frame, the free ends of which are flanged and adapted to engage with the slots in the gage frame, means to lock the adjustable measuring members in position, together with means to lock the micrometer-head positioning members in position, substantially as described.

In witness whereof I have hereunto set my hand in the presence of two witnesses.

MAX WOLMER HANSEN WOLDGAARD.

Witnesses:
FREDERICK JAMES MEREDITH,
HENRY JUNCA.